(12) United States Patent
Tamaoki et al.

(10) Patent No.: US 6,260,377 B1
(45) Date of Patent: *Jul. 17, 2001

(54) REFRIGERATING APPARATUS

(75) Inventors: Yuichi Tamaoki; Yasushi Sakata, both of Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/656,358

(22) Filed: Sep. 6, 2000

Related U.S. Application Data

(63) Continuation of application No. 09/214,545, filed on Mar. 5, 1999, now Pat. No. 6,128,914.

(51) Int. Cl.[7] ............................................. F25D 11/00
(52) U.S. Cl. ............................................................ 62/440
(58) Field of Search ............................. 62/440, 114, 129; 312/400, 401

(56) References Cited

U.S. PATENT DOCUMENTS

| | | |
|---|---|---|
| 2,779,066 | 1/1957 | Gaugler et al. . |
| 3,733,845 | 5/1973 | Lieberman . |
| 3,959,787 | 5/1976 | Messmann et al. . |
| 4,107,833 | 8/1978 | Knight et al. . |
| 5,943,876 | 8/1999 | Meyer et al. . |
| 5,983,647 | 11/1999 | Uekado et al. . |
| 6,001,450 | 12/1999 | Tanimoto et al. . |
| 6,013,690 | 1/2000 | Coleman et al. . |
| 6,128,914 | * 10/2000 | Tamaoki et al. ...................... 62/440 |

* cited by examiner

*Primary Examiner*—William Doerrler
*Assistant Examiner*—Melvin Jones
(74) *Attorney, Agent, or Firm*—Darby & Darby

(57) ABSTRACT

A refrigerating apparatus improves the insulating effect of a refrigerating chamber which is maintained at ultra low temperatures by a twin refrigerating apparatus. A vertical ultra low-temperature freezer 1 is composed of an insulating frame with a composite structure of a vacuum insulating panel and a foam insulating material, an insulating door with a composite structure of vacuum insulating panels and a foam insulating material, and a twin refrigerating apparatus which cools goods stored in the insulating frame. Ultra low temperatures are produced by the twin refrigerating apparatus in which a high-temperature side refrigerant circuit and a low-temperature side refrigerant circuit are in cascade connection.

9 Claims, 6 Drawing Sheets

REFRIGERATING APPARATUS

This is a continuation, of application Ser. No. 09/214,545, filed Mar. 5, 1999, now U.S. Pat. No. 6,128,914 which is hereby incorporated herein by reference, in its entirety.

BACKGROUND OF THE INVENTION

1. Field of the Invention

The present invention relates to a refrigerating apparatus, and more particularly, it relates to a refrigerating apparatus with a vacuum insulating panel built in an insulating frame to maintain ultra low temperatures in the above-mentioned frame.

2. Description of the Related Art

Conventional ultra low-temperature freezers are designed to cool with a refrigerating apparatus of the twin refrigeration system to maintain the temperatures in a freezer under 85° C., using a little thicker insulating material in consideration of a temperature difference between the outside and the inside of the freezer to maintain the in-freezer temperature. In this case, the refrigerating apparatus becomes large and the insulating material becomes thick to maintain the in-freezer temperature.

In this manner, the conventional ultra low-temperature freezers require use of the twin refrigeration apparatus, causing the refrigerating apparatus itself to become large-sized. Also, unless the insulating material is made thick, the in-freezer temperature cannot be maintained. This leads to making the freezer itself large-sized and creating problems such as increased power consumption.

The present invention is intended to solve such problems and an object of the present invention is to provide a refrigerating apparatus which makes sure that the insulation performance in ultra low temperature will not decrease even though the insulation wall is made thin.

SUMMARY OF THE INVENTION

In a refrigerating apparatus according to the present invention comprising an insulating frame formed of a composite structure of a vacuum insulating panel and a foam insulating material, an insulating door made up of a composite structure of vacuum insulating panels and a foam insulating material, and a refrigerating apparatus for cooling goods stored in the insulating frame, there are provided a plurality of refrigerating circuits in cascade connection to make up the refrigerating apparatus so that when ultra low temperature is introduced into the heat insulating frame, heat leaks can be held low without making the insulating wall thick.

Also, in a refrigerating apparatus according to the present invention comprising an insulating frame formed of a composite structure of a vacuum insulating panel and a foam insulating material, an insulating door made up of a composite structure of vacuum insulating panels and a foam insulating material, and a refrigerating apparatus for cooling goods stored in the insulating frame, even if the refrigerating circuits of the refrigerating apparatus are filled up with refrigerants mixed with a plurality of refrigerants containing no chloride, that is, the refrigerants not detrimental to the ozone layer, the temperature in the insulating frame can be made ultra low and heat leaks can also be held low without making the insulating wall thick.

Also, in a refrigerating apparatus according to the present invention, comprising an insulating frame formed of a composite structure of a vacuum insulating panel and a foam insulating material, an insulating door made up of a composite structure of vacuum insulating panels and a foam insulating material, and a refrigerating apparatus for cooling goods stored in the insulating frame, a plurality of inner doors subdivided-from the insulating door are provided inside the insulating door, so that even when the temperature in the heat insulating frame is made ultra low, it is made difficult for the cold air in the frame to change with the outside air as the door is opened or shut.

Moreover, in addition to the above description, according to the present invention, the plurality of inner doors provided inside the insulating door are formed of a composite structure of vacuum insulating panels and a foam insulating material to prevent the cold air from escaping from the inner doors when the insulating door is opened.

Further, in a refrigerating apparatus according to the present invention comprising an insulating frame formed of a composite structure of a vacuum insulating panel and a foam insulating material, an insulating door made up of a composite structure of vacuum insulating panels and a foam insulating material, and a refrigerating apparatus for cooling goods stored in the insulating frame, a refrigerating circuit of the refrigerating apparatus is filled up with at least one refrigerant selected from HFC refrigerants of R-134a, R-407D, R-404A and R-508 to ensure that the temperature in the insulating frame can be held ultra low with generally available refrigerants without destroying the ozone layer.

Still further, in a refrigerating apparatus according to the present invention comprising an insulating frame formed of a composite structure of a vacuum insulating panel and a foam insulating material, an insulating door made up of a composite structure of vacuum insulating panels and a foam insulating material, and a refrigerating apparatus for cooling goods stored in the insulating frame, destruction of the ozone layer with the foaming agent is prevented by using R-134a or a mixture of R-134a and n-pentane as the foaming agent for the foam insulating material, while, at the same time, the insulating wall can be made thin in combination with the a vacuum insulating panel.

Furthermore, a refrigerating apparatus according to the present invention comprising an insulating frame formed of a composite structure of a vacuum insulating panel and a foam insulating material, an insulating door made up of a composite structure of vacuum insulating panels and a foam insulating material, and a refrigerating apparatus for cooling goods stored in the insulating frame is characterized by means for giving an alarm by buzzer, indicator light or the like when the temperature in the insulating frame goes over the preset temperature to show a decrease in cooling capacity when the insulating performance of the vacuum insulating panel has fallen off.

DESCRIPTION OF THE PREFERRED EMBODIMENTS

Figure 1:
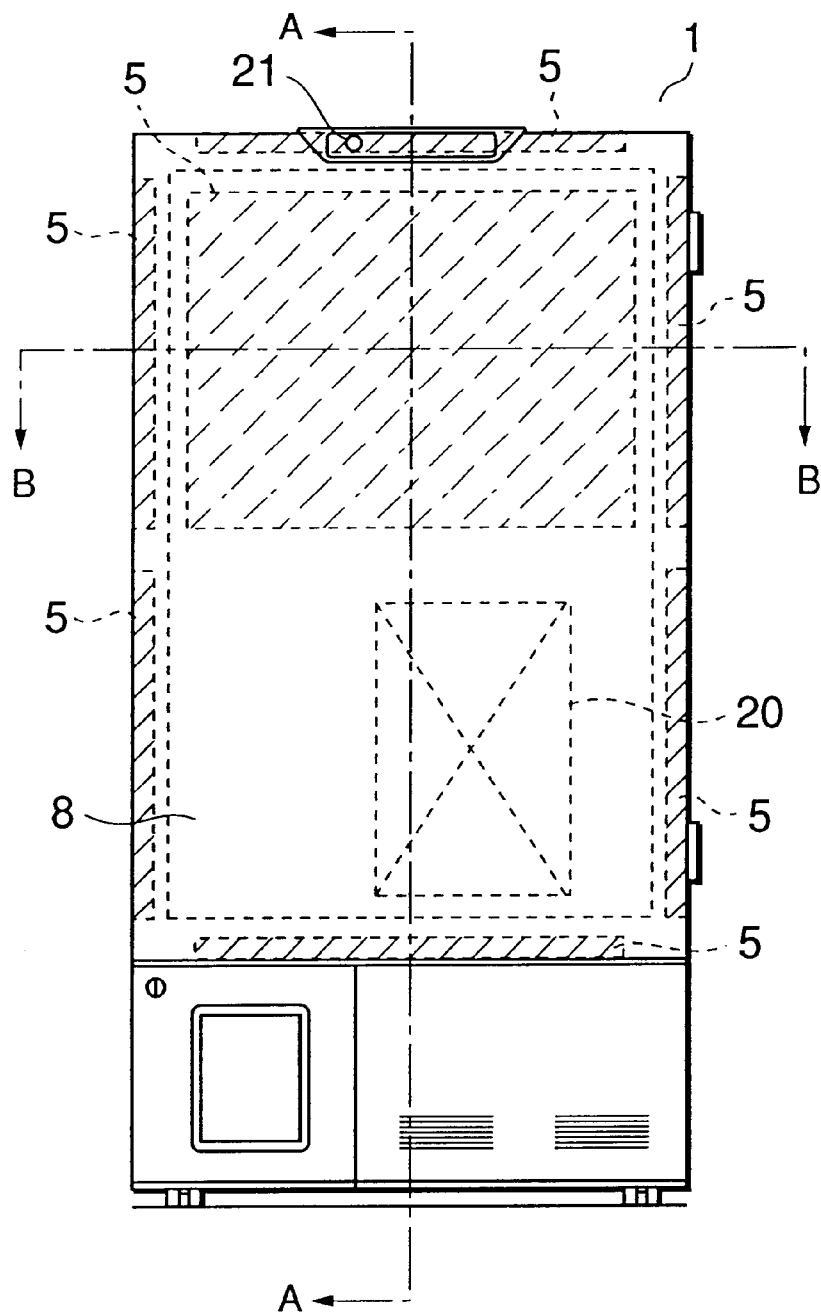
FIG. 1 is a front view of a vertical ultra low-temperature freezer, showing an embodiment constituted according to the present invention.
Figure 2:
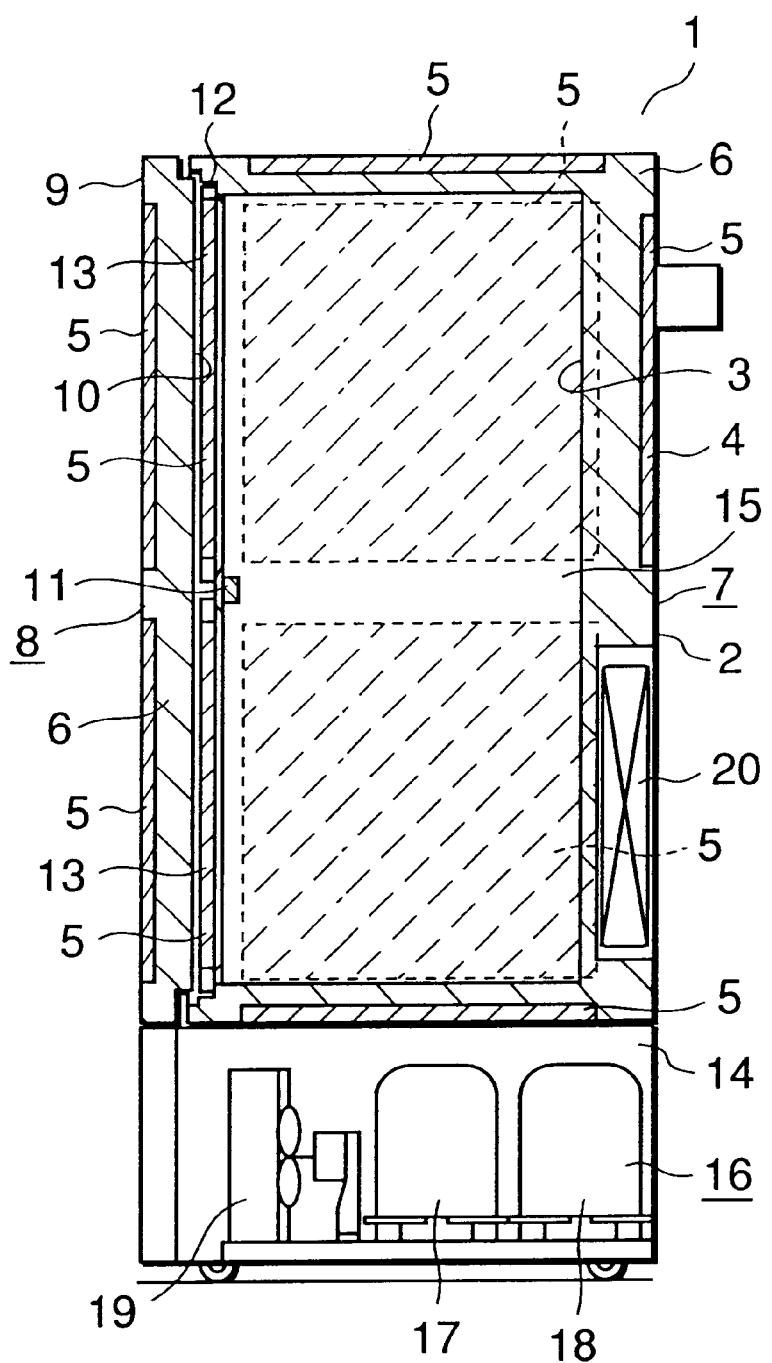
FIG. 2 is a sectional view taken on line A—A in FIG. 1 according to the present invention.
Figure 3:
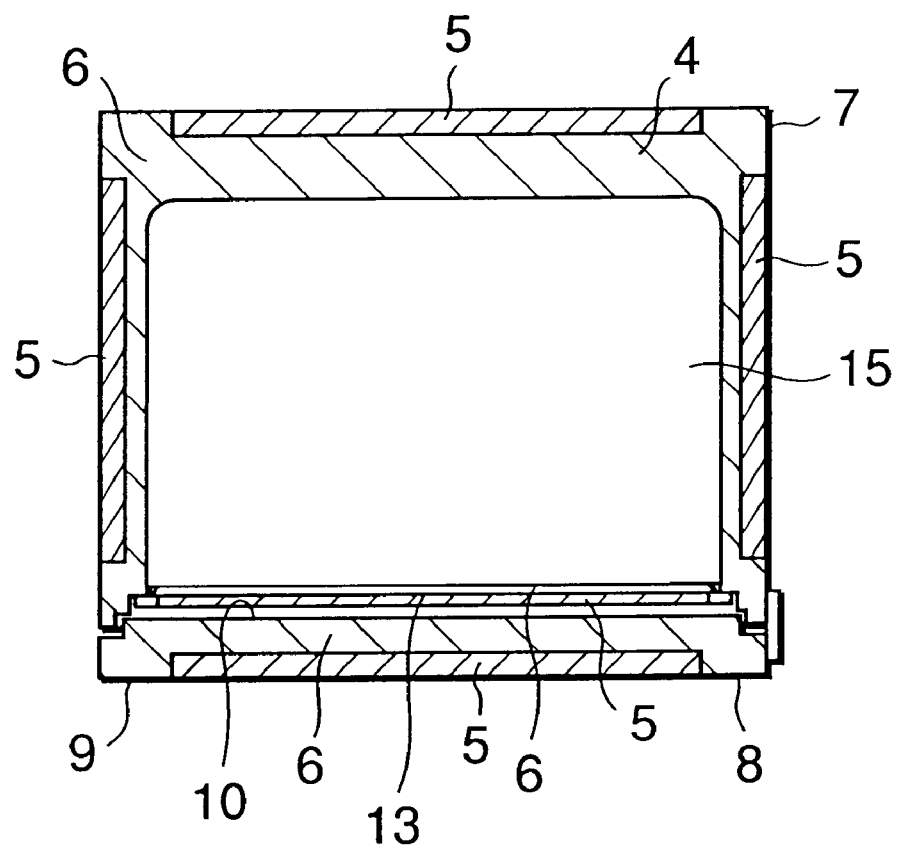
FIG. 3 is a sectional view taken on line B—B in FIG. 1 according to the present invention.
Figure 4:
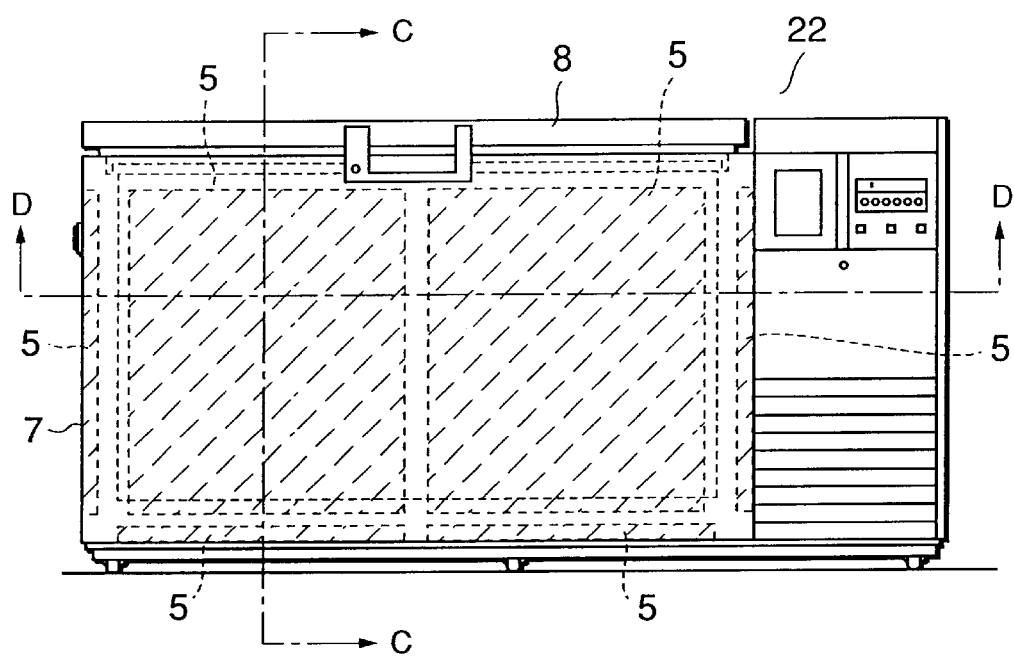
FIG. 4 is a front view of a horizontal ultra low-temperature freezer, showing another embodiment according to the present invention.
Figure 5:
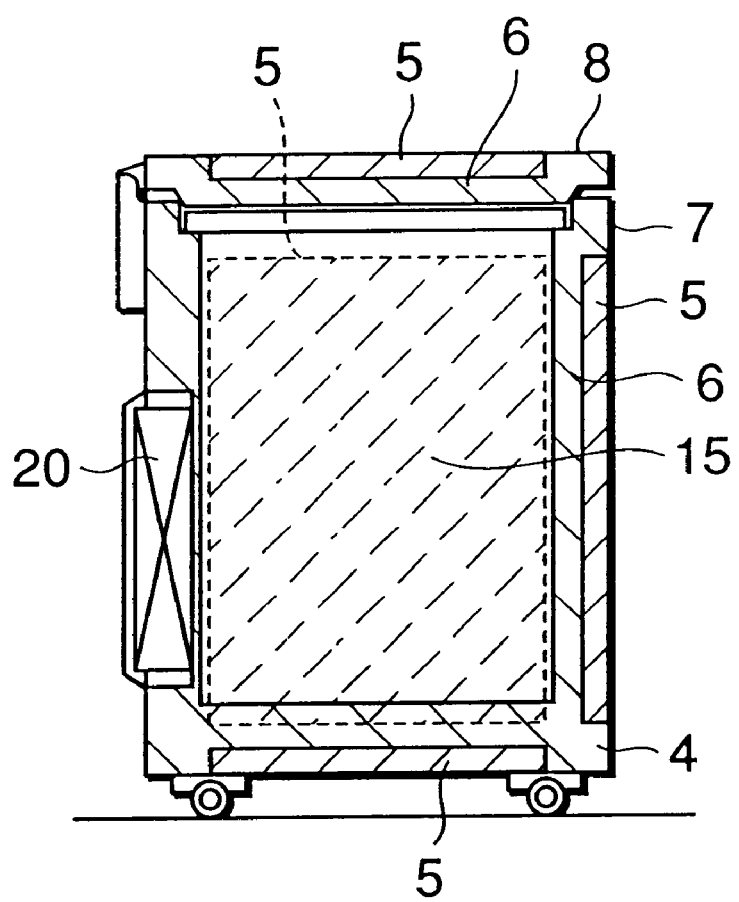
FIG. 5 is a sectional view taken on line C—C in FIG. 4 according to the present invention.
Figure 6:
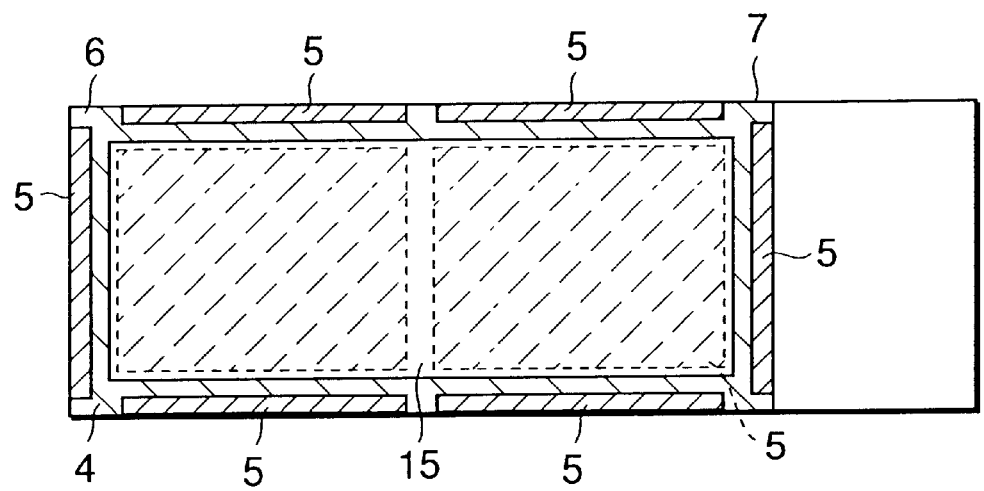
FIG. 6 is a sectional view taken on line D—D in FIG. 4 according to the present invention.
Figure 7:
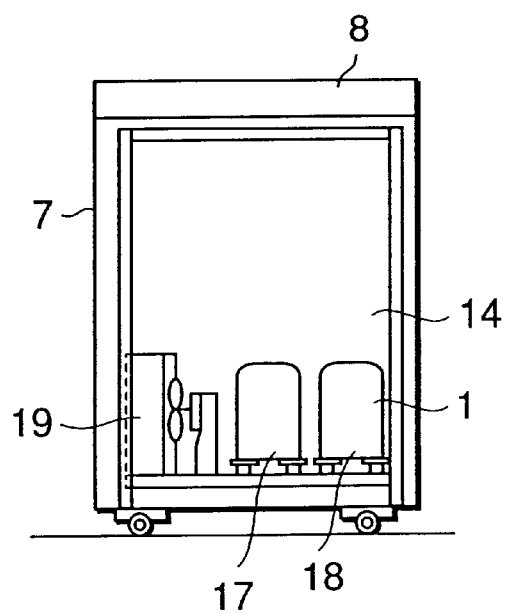
FIG. 7 is a side view of a horizontal ultra low-temperature freezer according to the present invention.

The present invention will be described below with reference to the drawings. FIG. 1 is a front view of a vertical ultra low-temperature freezer, showing an embodiment constituted according to the present invention. FIG. 2 is a sectional view taken on line A—A in FIG. 1 according to the present invention. FIG. 3 is a sectional view taken along the line B—B in FIG. 1 according to the present invention.

Reference numeral 1 indicates a vertical ultra low-temperature freezer. This freezer 1 includes an insulating frame 7 made up of a steel plate-made outer box 2 opening toward the front, a stainless steel-made inner box 3, a vacuum insulating panel 5 attached to the inside of the outer box 2 between the inner box 3 and the outer box 2, and a foam polyurethane insulating material 6 charged by the on-site foaming method to between the outer box 2 and the inner box 3.

An opening of this insulating frame 7 is closed with freedom of opening and shutting by an insulating door 8 abutting on the front of the insulating frame 1. This insulating door 8 comprises an steel plate-made outer door plate 9 and an inner door plate 10, a vacuum insulating panel 5 provided between the inner door plate 10 and the outer door plate 9, and a foam polyurethane insulating material 6 charged by the on-site foaming method to there between.

At the front opening of the inner box 3 is provided a front sectioning member 11 interposed in the middle dividing the opening into the top and bottom. Facing the inside of the insulating door 8, a different level part 12 is formed on the inside of the opening of the insulating frame 7 with provision of two inner doors 13 abutting on the different level part 12 and the front sectioning member 11. The vacuum panel 5 is provided in the inner doors 13 and 13 which are further charged with the foam polyurethane insulating material 6 by means of the on-site foaming method.

A twin refrigerating apparatus 16 for refrigerating the inside of a refrigerating chamber 15 is installed in a machinery chamber 14 under the insulating frame 7. This twin refrigerating apparatus 16 comprises two systems of a high-temperature side refrigerant circuit and a low-temperature side refrigerant circuit. A high-temperature side compressor 17 and a low-temperature side compressor 18 as well as a condenser 19 on the high-temperature side of the twin refrigerating apparatus 16 are housed in the machinery chamber 14.

At the bottom of the back side of the insulating frame 7 is placed a cascade condenser 20 exchanging heat with the high-temperature refrigerant circuit and the low-temperature refrigerant circuit. The high-temperature refrigerant circuit is filled up with the R-407D (R-32/R-125/R-143a) refrigerant of high evaporation temperature and the low-temperature refrigerant circuit is filled up with the R-508 (R-23/R-116) refrigerant of low evaporation temperature. Also, as the foaming agent of the foam polyurethane insulating material 6, the mixed refrigerant of R-134a and n-pentane is employed.

Numeral 21 indicates an indicator light showing unusual temperatures by means of a temperature sensor 22 detecting the temperature in the refrigerating chamber 15. Instead of the temperature sensor 22 in the refrigerating chamber 15, an arrangement may be made to detect the vacuum degree of the vacuum insulating panel 5 and decreases in insulating performance of the insulating frame 7 and the insulating door 8, thereby notifying unusual temperatures in the refrigerating chamber 15.

In the vertical ultra low-temperature freezer 1 constituted in this manner, the inside of the refrigerating chamber is cooled down-to ultra low temperatures under –85° C by the low-temperature refrigerant circuit of the high-temperature side refrigerant circuit and the low-temperature refrigerant circuit of the twin refrigerating apparatus 16.

It is at this point that a temperature difference with the outside of the freezer will grow because the inside temperature of the refrigerating chamber 15 is maintained at ultra low temperatures under –85° C. and, depending on the performance of the insulating wall, effects of heat infiltration from the outside will rise to cause the inside temperature of the refrigerating chamber 15 to increase as well. But, according to the present invention, such temperature increases due to the insulating frame 7 and the vacuum insulating panel 5 of the insulating door 8 can be prevented and that even if the insulating wall is made thin, the same insulating performance can be maintained due to the insulating frame 7 and the vacuum insulating panel 5 of the insulating door 8.

Further, since two inner doors 13 and 13 are provided in the insulating door 8, when stored goods are removed, after the insulating door 8 is opened, one of the inner doors 13 will be opened. As a result, even when such goods are taken out, the opening area of the insulating frame 7 is arranged to be reduced so as to minimize cold air leaks. Still further, because the vacuum insulating panel 5 is also provided in the inner doors 13, the insulating performance can be improved.

Furthermore, by thinning the insulating walls of insulating frame 7 and the insulating door 8, the outer dimensions of the vertical ultra low-temperature freezer 1 can be reduced, when the in-freezer volume is the same. Alternatively, when the outer dimension is the same, the in-freezer volume can be increased.

Moreover, inasmuch as the foam polyurethane insulating material 6 for the insulating frame 7, the insulating door 8 or the like has been subjected to foaming by using the refrigerant of R-134a mixed with n-pentane without using the CFC refrigerant or the HCFC refrigerant which is subject to restrictions, the vacuum insulating panel can be disassembled or reused in a manner not detrimental to the ozone layer. Also, since the CFC refrigerant or the HCFC refrigerant subject to restrictions is not used for the refrigerant of the twin refrigerating apparatus 16, ozone layer destruction can be prevented.

In addition, by placing a cascade condenser 20, which provides a cascade connection between the high-temperature side refrigerant circuit and the low-temperature side refrigerant circuit, in the back of the insulating frame 7, heat leaks can be held down without using the vacuum insulating panel 5 for that part, and it is designed so that this can contribute to reducing the frequency of using the vacuum insulating panel 5.

Although the foregoing description is about the vertical ultra low-temperature freezer 1, as shown from FIG. 4 to FIG. 7, needless to say, the same effects can be obtained with respect to the horizontal ultra low-temperature freezer 1. The same numbering is given to the same or corresponding part as the vertical ultra low-temperature freezer 1.

Because the horizontal ultra low-temperature freezer 1 has the opening of the insulating frame 7 facing upward, even when the insulating door 8 is opened or shut, very little amount of cold air will leak from inside the freezer, thus making it possible to maintain the temperature under ultra low temperatures properly.

POSSIBILITY OF INDUSTRIAL UTILIZATION

As described above, a refrigerating apparatus according to the present invention comprises an insulating frame formed of a composite structure of a vacuum insulating panel and a foam insulating material, an insulating door made up of a composite structure of vacuum insulating panels and a foam insulating material, and a refrigerating apparatus for cooling goods stored in the insulating frame, wherein a plurality of refrigerating circuits are in cascade connection to make up the refrigerating apparatus so that when ultra low temperature is introduced to in the heat insulating frame, heat leaks can be held low without making the insulating wall thick.

Also, a refrigerating apparatus according to the present invention comprising an insulating frame formed of a composite structure of a vacuum insulating panel and a foam insulating material, an insulating door made up of a composite structure of vacuum insulating panels and a foam insulating material, and a refrigerating apparatus for cooling goods stored in the insulating frame is backed by the use of refrigerants mixed with a plurality of refrigerants containing no chloride to fill up the refrigerating circuits of the refrigerating apparatus. This means that even when the refrigerants not detrimental to the ozone layer are used, the temperature in the insulating frame can be made ultra low and heat leaks can also be held low without making the insulating wall thick.

In addition, in a refrigerating apparatus according to the present invention comprising an insulating frame formed of a composite structure of a vacuum insulating panel and a foam insulating material, an insulating door made up of a composite structure of vacuum insulating panels and a foam insulating material, and a refrigerating apparatus for cooling goods stored in the insulating frame, there are provided a plurality of inner doors subdivided from the insulating door on the inside of this insulating door. As a result, even when the temperature in the heat insulating frame is made ultra low, it is made difficult for the cold air in the frame to change with the outside air as the door is opened or shut.

Moreover, in a refrigerating apparatus according to the present invention, the plurality of inner doors provided on the inside of the insulating door are formed of a composite structure of vacuum irsulating panels and a foam insulating material. Consequently, temperature increases conveyed through the inner doors when the insulating door is opened can be prevented to keep the cold air from escaping from the inner doors.

Further, a refrigerating apparatus according to the present invention comprising an insulating frame formed of a composite structure of a vacuum insulating panel and a foam insulating material, an insulating door made up of a composite structure of vacuum insulating panels and a foam insulating material, and a refrigerating apparatus for cooling goods stored in the insulating frame, is characterized in that the refrigerating circuits of the refrigerating apparatus are filled up with at least more than one kind of refrigerants chosen from the R-134a, R-407D, R-404A, and R-508 HFC refrigerants, thereby keeping the temperature in the insulating frame on the ultra low levels by using generally available refrigerants without destroying the ozone layer.

Still further, in a refrigerating apparatus according to the present invention comprising an insulating frame formed of a composite structure of a vacuum insulating panel and a foam insulating material, an insulating door made up of a composite structure of vacuum insulating panels and a foam insulating material, and a refrigerating apparatus for cooling goods stored in the insulating frame, R-134a or a mixture of R-134a and n-pentane is used for the foaming agent of the foam insulating-material, thus preventing destruction of the ozone layer with the foaming agent, while, at the same time, the insulating wall can be made thin in combination with the vacuum insulating panels.

Furthermore, a refrigerating apparatus according to the present invention comprises an insulating frame formed of a composite structure of a vacuum insulating panel and a foam insulating material, an insulating door made up of a composite structure of vacuum insulating panels and a foam insulating material, and a refrigerating apparatus for cooling goods stored in the insulating frame, wherein means for giving an alarm by buzzer, indicator light or the like when the temperature in the insulating frame goes over the preset temperature is provided, thereby notifying a decrease in cooling capacity when the insulating performance of the vacuum insulating panel has fallen off.

What is claimed is:

1. A refrigerating apparatus which comprises an insulating door, an insulating frame formed of a composite structure of vacuum insulating panel and foam insulating material, and a refrigerating apparatus for cooling goods stored in the insulating frame, the refrigerating apparatus being constituted by a plurality of refrigerating circuits joined in cascade connection.

2. A refrigerating apparatus which comprises an insulating door, an insulating frame formed of a composite structure of vacuum insulating panel and foam insulating material, and a refrigerating apparatus for cooling goods stored in the insulating frame, the refrigerating circuits of the refrigerating apparatus being filled up with at least one refrigerant containing no chloride.

3. A refrigerating apparatus which comprises an insulating door, an insulating frame formed of a composite structure of vacuum insulating panel and foam insulating material, and a refrigerating apparatus for cooling goods stored in the insulating frame, a plurality of inner doors being provided on the inside of the insulating door.

4. A refrigerating apparatus which comprises an insulating door, an insulating frame formed of a composite structure of vacuum insulating panel and foam insulating material, and a refrigerating apparatus for cooling goods stored in the insulating frame, a refrigerating circuit of the refrigerating apparatus being filled up with at least one refrigerant selected from HFC refrigerants of R-134a, R-407D, R-404A and R-508.

5. A refrigerating apparatus which comprises an insulating door, an insulating frame formed of a composite structure of vacuum insulating panel and foam insulating material, and a refrigerating apparatus for cooling goods stored in the insulating frame, R-134a or a mixture of R-134a and n-pentane being used as a foaming agent for the foam insulating material.

6. A refrigerating apparatus which comprises an insulating door, an insulating frame formed of a composite structure of vacuum insulating panel and foam insulating material, and a refrigerating apparatus for cooling goods stored in the insulating frame, wherein there is provided a means for giving a temperature alarm when the temperature in the insulating frame goes over a predetermined temperature.

7. A refrigerating apparatus of claim 1, claim 2, claim 3, claim 4, claim 5, or claim 6, wherein the insulating frame is made up of an outer box, an inner box, the vacuum insulating panel and the foam insulating material, and the vacuum insulating panel is attached to the inside of the outer box and the foam insulating material is charged between the vacuum insulating panel and the inner box.

8. A refrigerating apparatus of claim 1, claim 2, claim 3, claim 4, claim 5, or claim 6, wherein the insulating door is made up of a composite structure of vacuum insulating panel and foam insulating material.

9. A refrigerating apparatus of claim 1, claim 2, claim 3, claim 4, claim 5, or claim 6, wherein the insulating frame is made up of an outer box, an inner box, the vacuum insulating panel and the foam insulating material, and the vacuum insulating panel is attached to the inside of the outer box and the foam insulating material is charged between the vacuum insulating panel and the inner box, and wherein the insulating door is made up of a composite structure of vacuum insulating panel and foam insulating material.

* * * * *

UNITED STATES PATENT AND TRADEMARK OFFICE
CERTIFICATE OF CORRECTION

PATENT NO. : 6,260,377 B1
DATED : July 17, 2001
INVENTOR(S) : Yuichi Tamaoki and Yasushi Sakata It is certified that error appears in the above-identified patent and that said Letters Patent is hereby corrected as shown below:

<u>Title page, Item [54] and Column 1, line 1,</u>
"REFRIGERATING APPARATUS" to -- LOW TEMPERATURE STORAGE CABINET --.

<u>Title page,</u>
Add: -- [30] Foreign Application Priority Data,
April 25, 1997     (JP) ..................... 9-109435 --.

Signed and Sealed this

Ninth Day of July, 2002

*Attest:*

*Attesting Officer*

JAMES E. ROGAN
*Director of the United States Patent and Trademark Office*